United States Patent [19]

deBoer et al.

[11] Patent Number: 4,591,898
[45] Date of Patent: May 27, 1986

[54] SIGNAL-DROPOUT CORRECTION CIRCUIT FOR CORRECTING VIDEO SIGNALS DISTURBED BY SIGNAL DROPOUTS

[75] Inventors: Eeltje deBoer; Arie Huijser, both of Eindhoven, Netherlands

[73] Assignee: U.S. Philips Corporation, New York, N.Y.

[21] Appl. No.: 576,975

[22] Filed: Feb. 3, 1984

[30] Foreign Application Priority Data

Oct. 17, 1983 [NL] Netherlands .................. 8303559

[51] Int. Cl.[4] ............ H04N 9/88; H04N 5/94; H04N 5/78; H04N 9/79
[52] U.S. Cl. .................. 358/36; 358/336; 358/327; 358/314; 360/38.1
[58] Field of Search ............ 358/314, 336, 327, 340, 358/36, 163, 167, 21 R, 37, 166; 360/38.1

[56] References Cited

U.S. PATENT DOCUMENTS 4,509,078  4/1985  Kuroda .................. 358/314 X

FOREIGN PATENT DOCUMENTS 2217724  12/1979  Fed. Rep. of Germany ...... 358/314
0107683  7/1982  Japan ..................... 358/36

Primary Examiner—Michael A. Masinick
Assistant Examiner—Michael P. Dunnam
Attorney, Agent, or Firm—Robert T. Mayer; Algy Tamoshunas

[57] ABSTRACT

A dropout correction circuit is described. It comprises a dropout detector which compares a signal with a reference level and controls a switch which connects an output of the circuit to a line memory, in order to insert a corresponding part of a preceding line during such a dropout. In order to enable the reference level to be selected as high as possible the color carrier is extracted before the video signal is applied to the dropout detector.

2 Claims, 4 Drawing Figures

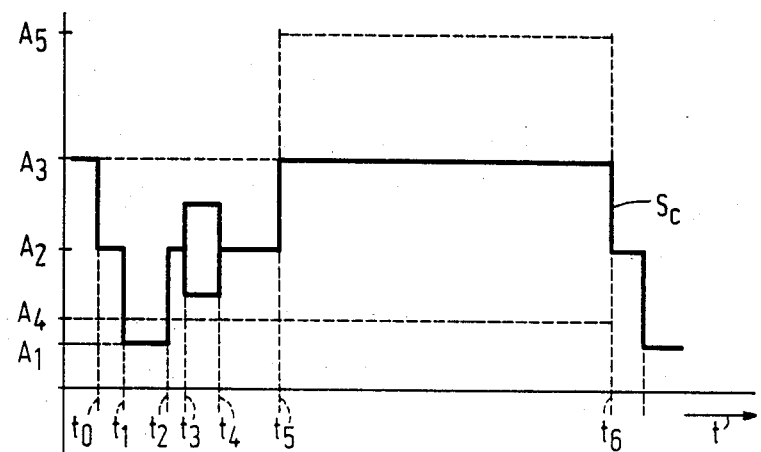
FIG.1a
FIG.1b
FIG.1c
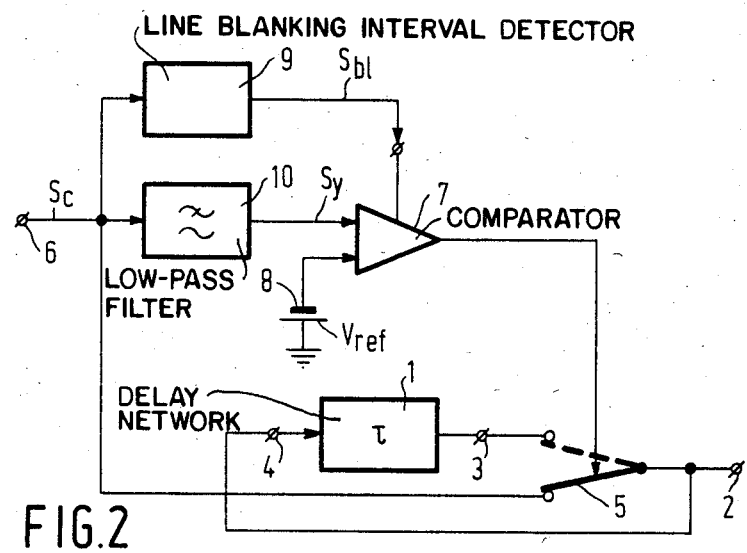
FIG.2

SIGNAL-DROPOUT CORRECTION CIRCUIT FOR CORRECTING VIDEO SIGNALS DISTURBED BY SIGNAL DROPOUTS

BACKGROUND OF THE INVENTION

The invention relates to a signal-dropout correction circuit for correcting video signals disturbed by signal dropouts, which circuit comprises a storage circuit for the continuous storage of at least one preceding line of the video picture, switching means for connecting a video-signal output to either an output of the storage circuit or a video-signal input, and a signal-dropout detector for comparing the level of the video signal with a reference level in order to switch the switching means to such a position that the storage circuit is read out when the level of the video signal drops below said reference level.

Such a circuit is used inter alia in a video-disc player known by the name of "Laservision".

In the known apparatus the reference level lies below the lower level of the line-synchronizing pulses, which is for example 300 mV below black level for PAL-signals. Therefore it happens frequently that signal dropouts of small depth are not corrected, which becomes visible in particular in the case of pictures with a dark background.

SUMMARY OF THE INVENTION

It is the object of the invention to improve the known circuit in this respect and to this end the invention is characterized by a filter circuit for extracting the colour carrier from the video signal before this signal is applied to the signal-dropout detector.

The step in accordance with the invention enables the reference level to be selected just below black level, so that substantially more signal-dropouts are detected.

BRIEF DESCRIPTION OF THE DRAWINGS

The invention will now be described in more detail, by way of example, with reference to the drawing, in which:

FIGS. 1a, 1b, and 1c show some signal waveforms to explain the operation of the circuit in accordance with the invention, and FIG. 2 shows an embodiment of a circuit in accordance with the invention.

DETAILED DESCRIPTION

FIG. 1a schematically represents a demodulated video signal comprising a luminance signal and a colour carrier wave. Between the instants $t_1$ and $t_2$ the signal comprises a line-synchronizing pulse of a level $A_1$, which at the instant $t_2$ changes to a black level $A_2$. This is followed by the colour burst from the instant $t_3$ to the instant $t_4$. The colour burst and the line-synchronizing pulse are situated between instants $t_0$ and $t_5$, between which no picture signal is present (the so-called line-blanking interval). Between the instants $t_5$ and $t_6$ a picture signal appears. This signal comprises a luminance signal with a minimum value of $A_2$ (black level), which luminance signal is represented as a signal of a level $A_3$, i.e. a line of constant brightness, in the present case. This brightness corresponds to a colour which is determined by the colour carrier and which is constituted by high-frequency oscillation between the levels $A_4$ and $A_5$. For example, for saturated red the level $A_4$ lies below the black level $A_2$, but above the level $A_1$ defined by the line-synchronizing pulse.

The video signal may be subject to signal-dropouts, for example when the signal originates from a video disc or video recorder. It is known to detect such a drop-out and to insert a corresponding part of a preceding line or a corresponding line of a preceding field at this location. For this purpose the apparatus shown in FIG. 2 comprises a delay network 1, for example a glass delay line, a shift register or a memory circuit, with a delay capacity of one line period, the signal on the video output 2 being constantly applied to the input of this delay network. The video signal which has been delayed by one line period is then constantly available on the output 3 of the delay network 1. By means of a switch 5 output 2 can be connected either to the output of the delay network 1 or to a video input 6. The switch 5 is controlled by a comparator 7, which has one input connected to the video input 6 and the other input to a reference-voltage source 8 carrying a reference voltage $V_{ref}$.

In order to detect signal dropouts the detection level in the known apparatus is selected below the level $A_1$ (FIG. 1a), i.e. $V_{ref} < A_1$, which level remains below the colour burst and the colour carrier. If such a signal dropout occurs, this will be detected by the comparator 7 when this signal dropout is deeper than the level $V_{ref}$. Comparator 7 then connects output 2 to the shift register 1.

In order to ensure that signal dropouts appearing in the picture are compensated for, the line-blanking interval detector 9 supplies a pulse signal $S_{b1}$ (FIG. 1c) which is applied to the comparator 7 as a disable signal, so that switch 5 remains connected to input 6 between the instants $t_0$ and $t_5$.

The known method only detects deep signal dropouts. However, it frequently happens that shallow dropouts occur which only manifest themselves as colour dropouts in pictures with a dark background.

In order to solve this problem the circuit shown in FIG. 2 comprises a filter 10 having such a cut-off frequency that the luminance signal is transmitted and the colour carrier is not transmitted. The signal of $S_y$ then obtained is shown in FIG. 1b. When this filter is arranged between the input 6 and the comparator 7, the comparator 7 will compare the luminance signal, which has a minimum level equal to the black level $A_2$, with a reference voltage $V_{ref}$ between the instants $t_5$ and $t_6$ only, i.e. not during the line-blanking interval. The reference level can now be selected just below the black level $A_2$, so that minimal signal dropouts can still be detected.

What is claimed is:

1. A signal dropout correction circuit for correcting video signals disturbed by signal dropouts, which circuit comprises:

a storage circuit for storing at least one preceding line of a video picture, switching means for connecting a video-signal output to either an output of the storage circuit or a video-signal input, and a signal-dropout detector for comparing the level of the video signal with a reference level in order to switch the switching means to such a position that the storage circuit is read out when the level of video signal drops below said reference level, and a filter circuit for extracting the colour carrier from the video signal before the video signal is applied to the dropout detector.

2. The circuit according to claim 1 including means for disabling said detector during line blanking intervals of said video signal so that during said blanking intervals said video output is connected to said video signal input by said switching means.

* * * * *